Nov. 3, 1931. F. H. BECKER 1,830,692
MULTIPLE CUTTING TOOL
Filed Oct. 29, 1930
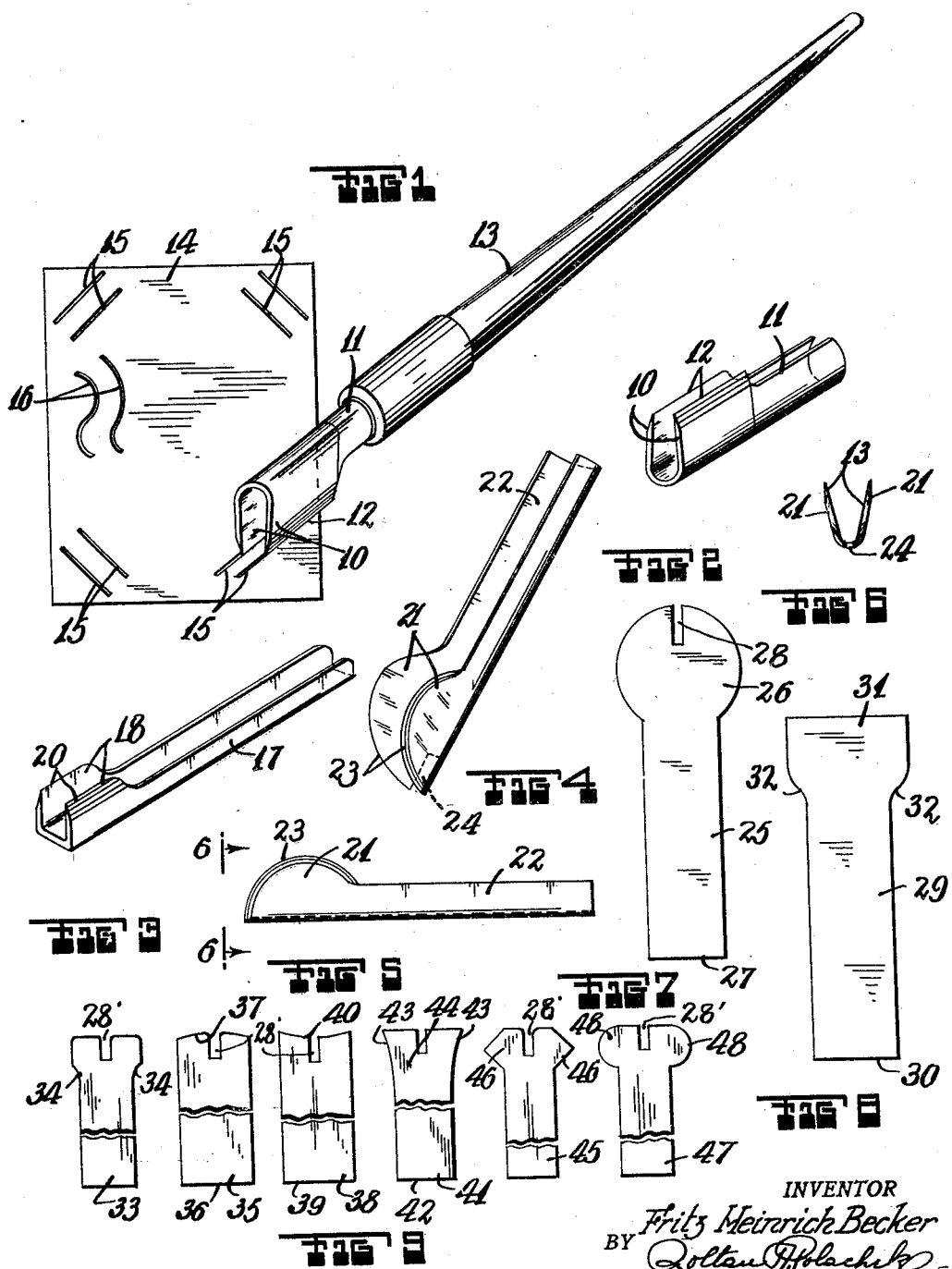
INVENTOR
Fritz Heinrich Becker
BY Zoltan Pfolachek
ATTORNEY Patented Nov. 3, 1931

1,830,692

UNITED STATES PATENT OFFICE

FRITZ HEINRICH BECKER, OF IRVINGTON, NEW JERSEY

MULTIPLE CUTTING TOOL

Application filed October 29, 1930. Serial No. 491,961.

This invention relates to new and useful improvements in a multiple cutting tool.

The invention has for an object the provision of a multiple cutting tool which is adapted to cut sheets for receiving pictures, plants, stamps, souvenirs, clippings, sample materials and the like, and which is also capable of cutting out monograms and stencils.

It is another object of this invention to provide in a multiple cutting tool a substantially U shaped handle adapted to engage in place of the customary nib in a penholder for manipulation.

A further object of this invention is to provide spaced cutting portions upon the multiple cutting tool which are connected with a handle portion.

A still further object of this invention is to arrange the above mentioned cutting portions at an inclination to each other so that when the tool is operated at different angles to the horizontal, parallel cuts are produced which are spaced different distances apart.

A further object of this invention is the provision of a sheet member bent from a blank and having certain edges sharpened so as to produce parallel cuts.

This invention has for a still further object the production of a device of the class mentioned which is of simple durable construction, dependable in use and efficient in action, and which can be manufactured and sold at a reasonable cost.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:—

Fig. 1 is a perspective view of a cutting tool supported upon a pen-holder and shown in the operation of cutting one corner of a sheet.

Fig. 2 is a perspective view of the cutting tool shown in Fig. 1 per se.

Fig. 3 is a perspective view of a modified form of tool.

Fig. 4 is another perspective view of a still further modified form of tool.

Fig. 5 is a side elevational view of Fig. 4.

Fig. 6 is an end elevational view looking in the direction of the line 6—6 of Fig. 5.

Fig. 7 is a plan view of a blank for producing the tool shown in Fig. 4.

Fig. 8 is a plan view of a blank for producing the tool shown in Fig. 3.

Fig. 9 is a plan view of a plurality of blanks for producing different cutting tools.

In Figs. 1 and 2 the multiple cutting tool comprises a sheet member shaped with a pair of spaced cutting portions 10 connected with a handle portion 11. The sheet member is bent along its longitudinal center line so as to be uniform at both sides. The cutting portions 10 are shown parallel to each other and their edges 12 are sharpened to accomplish the cutting. The rear end or handle portion 11 is adapted to fit within a pen-holder similar to the fashion in which a pen point is supported.

In Fig. 1 particularly, a pen-holder 13 has been shown supporting the tool. This pen-holder may be of any conventional design and construction. A sheet of paper 14 is also illustrated which is formed at the corners with a plurality of inclined parallel cuts 15 produced by the cutting tool. As illustrated on the drawings, the tool is in the operation of cutting the parallel slots at one of the corners of the sheet. The tool can also be used for cutting parallel curved lines such as shown at 16 upon the sheet. These curved lines, of course, could be arranged at the corner of the sheet in lieu of the straight lines. The various cuts may be used to support a picture, a plant, a stamp, a souvenir, a clipping, a sample of material or the like. The tool may also be used to cut out a monogram or a stencil.

In Fig. 3 a modified form of tool has been shown, which distinguishes from the tool shown in Fig. 2 in that it is of channel shape instead of U shape. Further, its handle portion 17 is materially longer so that it may be manually operated instead of requiring attachment to a penholder. The cutting portions are indicated by reference numeral 18. The edges of the cutting portion are sharpened, indicated by numeral 20, so that cutting is possible.

In Figs. 4 to 7 inclusive, another form of the device has been illustrated which is shown to comprise a sheet member shaped with a pair of spaced cutting portions 21 connected with a handle 22. The sheet is of V shape and is bent along its longitudinal center line. The cutting portions 21 are of sector shape, or any other curved shape. The edges of the sectors are sharpened, as indicated by reference numeral 23. A notch 24 is formed at the free points of the cutting portions. The tool may be moved towards the right and held at the inclination illustrated in Fig. 4 to cut a pair of slots parallel to each other and of a width equal to the width of the slot 24. In the event that it is required to cut parallel slots spaced differently from this particular width, the tool may be turned around so that the curved cutting portions 12 are directed downwards. Then it may be inclined to any desirable degree and thus drawn along the sheet. It should be noticed that from the bend of the V shape to the free ends, the tool keeps on getting wider and this allows for the different distances between the cut slots.

In Fig. 7 a blank has been illustrated for the making of the tool illustrated in Figs. 4 to 6 inclusive. This blank is shown to comprise a flat sheet 25 formed at one end with a circular portion 26. The outer end is straight, indicated by reference numeral 27. A slot 28 is formed in the curved end 26 to correspond with the slot 24 when the tool is shaped. It is only necessary to bend the tool along its longitudinal center line to V shape to produce the tool shown in Fig. 4. In Fig. 8 a blank has been illustrated for the manufacture of the tool shown in Fig. 3. This blank comprises a flat sheet 29 having straight ends 30 and 31 respectively. The end 31 is slightly larger than the other end, and the sides are curved as indicated by reference numeral 32 so as to produce the different widths mentioned. When this tool is formed as shown in Fig. 3, it is merely necessary to bend it into channel shape.

In Fig. 9 a plurality of blanks have been illustrated for making tools of different forms. The first blank from the left, indicated by reference numeral 33, is very similar to the blank shown in Fig. 8 except that it has at the sides curved portions 34 which are formed from one curve only instead of two curves as shown in Fig. 8. The next tool, indicated by reference numeral 35, has both sides straight, as one straight end 36, and a convexed end 37. The next tool, indicated by reference numeral 38, has straight sides and a straight end 39. The other end 30 is concaved. The next tool, indicated by reference numeral 41, has a straight end 42, sides which are partially straight and then converge outwards in smooth curved portions 43, and terminate in a straight end 44. The next tool, indicated by reference numeral 45, has straight ends and the sides are substantially straight along their complete lengths except at one of their ends where they are formed with pointed portions 46. The last tool, indicated by reference numeral 47, is very similar to the tool 46 except that at the sides it has curved portions 48.

The various blanks illustrated in Fig. 9 may be bent along their longitudinal center lines so as to be of U shape, channel shape, or V shape in cross section, as before mentioned, and may also be provided with slots 28'.

While I have shown and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:—

1. A multiple cutting tool, comprising a sheet member shaped with a pair of spaced cutting portions connecting with a handle portion, said handle portion being shaped so as to fit into a pen-holder as a conventional nib does.

2. A multiple cutting tool, comprising a sheet member shaped with a pair of spaced cutting portions connecting with the handle portion, said sheet member being of V shape in transverse cross section, and said cutting portions being of sector shape having curved cutting edges.

3. A multiple cutting tool, comprising a sheet member shaped with a pair of spaced cutting portions connecting with the handle portion, said sheet member being of V shape in transverse cross section, and said cutting portions being of sector shape having curved cutting edges, the cut-out portion being arranged at the apex of the V providing two cutting points from which the cutting edges of the cutting portions diverge.

4. A blank for the manufacture of a multiple cutting tool, comprising a flat sheet member having its sides shaped to produce cutting portions upon being bent along its longitudinal center, a slot in said blank, said slot being adjacent the sides forming the said cutting portion.

5. A blank for the manufacture of a multiple cutting tool, comprising a flat sheet member having its sides shaped to produce cutting portions upon being bent along its longitudinal center, a slot in one end of said blank, said slot forming a symmetrical partial bisection between the said sides of the cutting tool.

In testimony whereof I have affixed my signature.

FRITZ HEINRICH BECKER.